2 Sheets—Sheet 1.

J. AFFLECK.

MIDDLINGS PURIFIER.

No. 7,023. Reissued April 4, 1876.

Witnesses
Fred. Geo. Dieterich
John Fearing.

Inventor.
John Affleck.
per D. C. Allen
Attorney.

N. PETERS, PHOTO-LITHOGRAPHER, WASHINGTON, D. C.

2 Sheets—Sheet 2.

J. AFFLECK.

MIDDLINGS PURIFIER.

No. 7,023. Reissued April 4, 1876.

WITNESSES.
Fred Gen. Dietrich
John Deering.

INVENTOR.
John Affleck.
per D. C. Allen
ATTORNEY.

N. PETERS, PHOTO-LITHOGRAPHER, WASHINGTON, D. C.

UNITED STATES PATENT OFFICE.

JOHN AFFLECK, OF BURLINGTON, IOWA, ASSIGNOR TO ROBERT L. DOWNTON AND JANE A. MILLER, OF ST. LOUIS, MISSOURI.

IMPROVEMENT IN MIDDLINGS-PURIFIERS.

Specification forming part of Letters Patent No. 150,502, dated May 5, 1874; reissue No. 7,023, dated April 4, 1876; application filed March 7, 1876.

*To all whom it may concern:*

Be it known that I, JOHN AFFLECK, of Burlington, county of Des Moines and State of Iowa, have invented certain Improvements in Middlings-Purifiers, of which the following is a specification:

The nature of my invention relates to improvements in devices for separating the different elements of which flour-middlings are composed; and the invention consists in the combination of a fan for producing ascending air-currents through a chamber in which the middlings to be purified pass, a reciprocating sieve for separating the middlings after being subjected to the air-currents, and a bolt for separating any flour that may be carried off by that portion of the air which passes it from the worthless material which passes with such flour. It also consists in an expanding air-chamber formed with an enlarged central portion, and contracted at its upper and lower ends. It further consists in combining with said expanding air-chamber a settling-chamber in which the heavy portions drawn off by the air-currents are deposited, and returned through a pipe to the expanding-chamber, to be again subjected to the ascending air-currents, as will be hereinafter more fully described.

Figure 1:
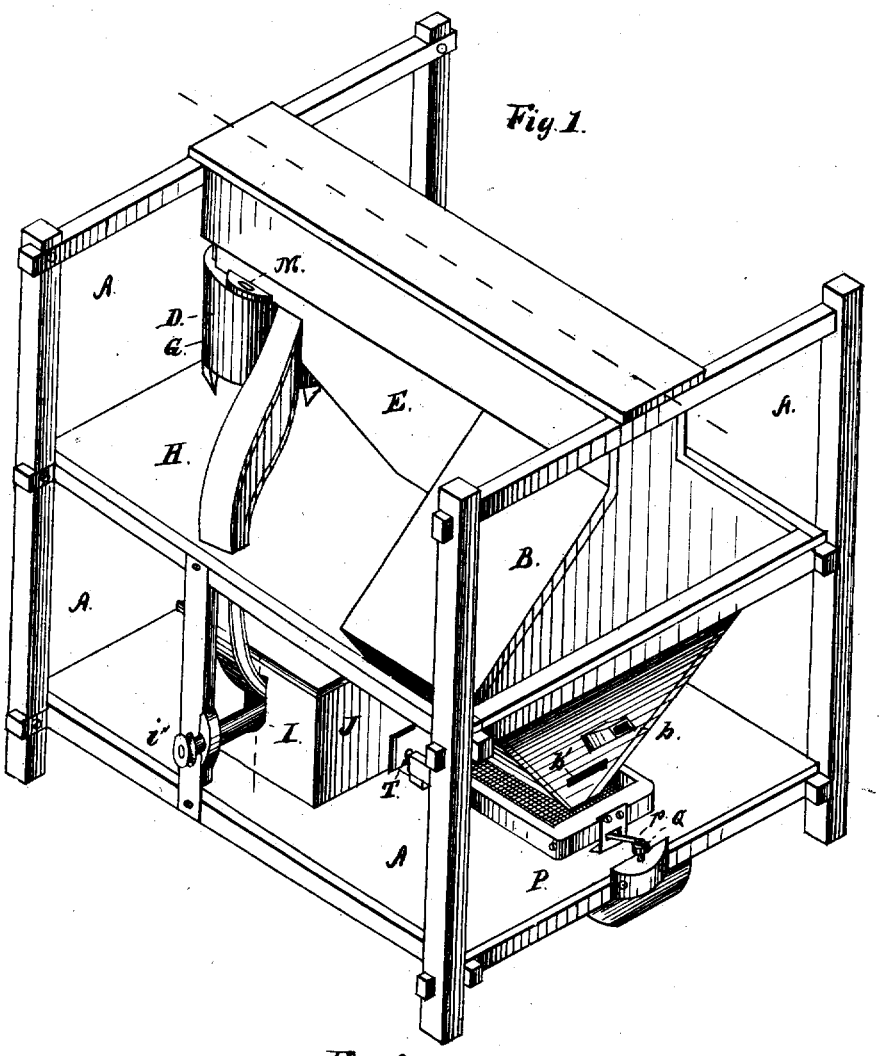
Figure 2:
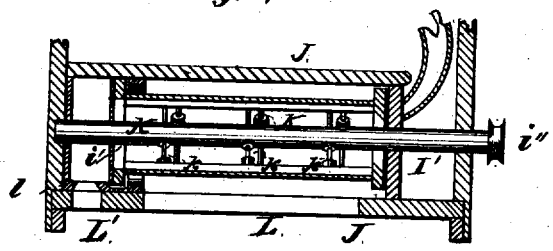
Figure 3:
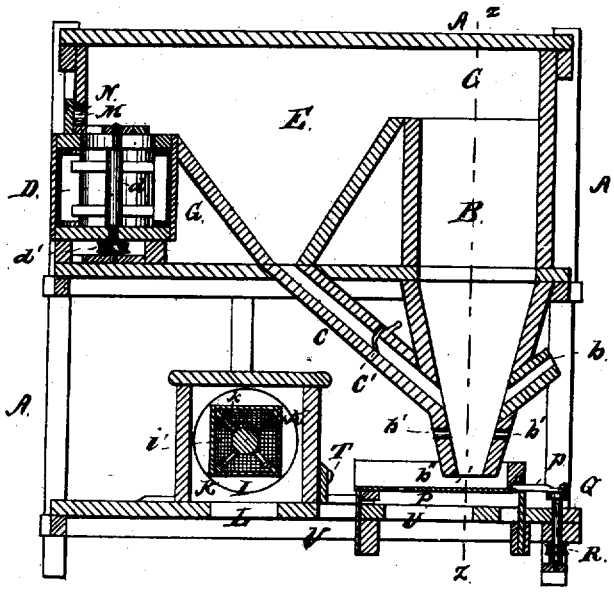
Figure 4:
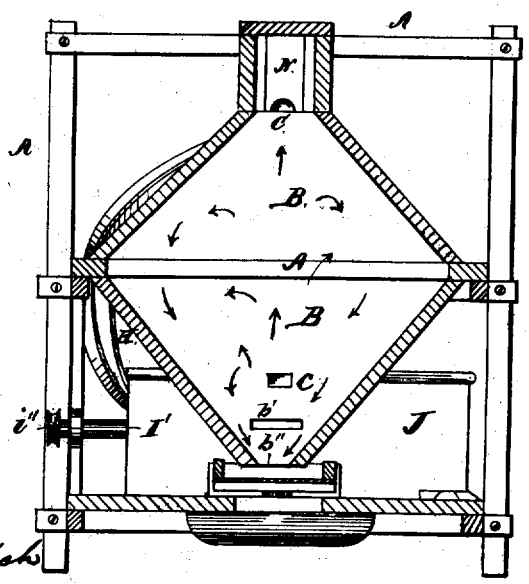

Figure 1 is a perspective view of a machine embodying my invention. Fig. 2 is a longitudinal vertical sectional view of the rotating bolt on the line *x x* of Fig. 1. Fig. 3 is a vertical sectional view of Fig. 1 on the plane of the line *y y*. Fig. 4 is a vertical sectional view of Fig. 3 on the plane of the line *z z*, and seen from the right-hand side thereof.

Letters A represent the frame for supporting the operating devices. B is the main separating-chamber, formed, as shown plainly in the drawings, with an enlarged central portion, and contracted at its upper and lower ends, and provided with a pipe, *b*, through which the middlings in their normal condition are fed to it in any desired manner. It is further provided with a pipe, C, leading from its open upper end to a common fan or blower, D. It is also pierced with openings *b′ b′* near its lower end, and below the entrance of the pipe *b*, through which air is drawn to the fan when in operation; and its lower end has an opening, *b″*, for purposes hereinafter described. E is a chamber with an enlarged upper end communicating with the under side and interior of the pipe C, as shown in Fig. 3, communicating by a pipe, *c*, with the chamber B above the openings *b′ b′*. *c′* is a valve in the pipe *c* opening toward the chamber B. G is a chamber containing the fan D, its upper end communicating with the pipe C, and provided with a pipe, H, leading from its side downward to and communicating with the interior of a rotating bolt, I, contained in a case, J. The air from the fan D is discharged through the pipe H into the end of the bolt I through a wire-cloth head, *i*, and, passing longitudinally through the bolt, is discharged through a wire-cloth head, *i′*, at its other end, the motion of the bolting-cloth on the periphery of the bolt I preventing the passage of the air through it. The bolt I is rotated by a central shaft, I′, having a pulley, *i″*, on its outer end, from which a band extends to any driving-wheel. K K K K are arms carrying reciprocating rings or knockers *k k k k*, which are operated in the usual manner by the rotation of the bolt, to produce a jarring motion thereof. L is an opening in the frame beneath the bolt I, and L′ is an opening in said frame just beyond the air-discharging end, and is provided with a cut-off slide, *l*. M M are cut-off slides in the upper part of the chamber G, and N is a slide controlling an opening to the interior thereof, for oiling, &c. The shaft *d* of the fan D extends downward, and carries on its lower end a pulley, *d′*, to which motion may be communicated from any suitable shaft or pulley. P is a sieve, of about No. 60 wire cloth, and is situated below the opening *b″* in the bottom of the chamber B, and is given a reciprocating motion by a rod, *p*, from a crank-wheel, Q, which is operated by a pulley, R, on its shaft. T T are projecting knobs on the case J, against which the sieve P strikes in reciprocating. U is an opening in the main frame-floor beneath the sieve P, and V is an opening in the floor beneath the discharge end of the sieve, next the case J.

A portion of the operation of my invention is deemed obvious from the foregoing description. Its further operation is as follows: The air entering the openings $b'$ $b'$ by the suction-fan D will be drawn upward in a column centrally through the chamber B, as shown by the straight arrows in Fig. 4, and the middlings entering the chamber B above the air-inlets $b'$ $b'$ will be caught by the current and carried upward. The amount of draft may then be regulated by the damper-slides M M, so as to draw the lighter portions over to the pipe C, while the heavier portions, consisting of the coarse flour and bran, will be deflected outward, as shown by the curved arrows in the same figure, and, falling by their own gravity through the eddying air at the sides of the chamber B, will pass through the opening $b''$ to the sieve P, where the coarse flour will be separated from the coarse bran, the flour falling through the sieve, and the bran shaking over its open end next the case J, and through the opening V. This bran may then be collected, constituting the principal hulls of the body of the grains, and the flour which has passed through the sieve P may be reground, forming a good quality of flour. The lighter portions of that which has entered the pipe C will be carried forward to the fan D, and driven thereby through the pipe H, into the bolt I, while the heavier portion which entered the same pipe will drop through the chamber E and pipe $c$ to the lower end of the chamber B, and be again subjected to the draft, as before described, the valve $c'$ preventing draft upward through the pipe $c$, and only opening to allow the descent of the middlings therein when a sufficient weight of them has accumulated above the valve $c'$ to open it by their downward pressure. The lighter flour and the fuzz-bran from the blossom ends of the grains, which have been forced into the bolt I, will be driven by the blast from the pipe H toward the other end of the bolt, and in passing through the bolt while it is rotating the knockers $k$ will jar the fuzz loose from the bolt-cloth and keep it in condition for the outward passage of the flour, which they also aid in jarring through. The blast will at the same time be forcing the fuzz-bran through the wire-cloth head $i'$, where it will drop through the opening L', and may be collected, the flour passing through the cloth of the bolt I, at the same time passing down through the opening L, where it may be collected, and will be found to be a fair second quality of flour.

The bolting-cloth on the bolt I should be about No. 12 cloth, and either of the devices of the whole machine may be turned in different positions, but the relative arrangement must be preserved.

I claim—

1. The combination, in a machine for purifying middlings, of a fan for producing an ascending air-current through a chamber in which the middlings to be operated upon pass, a reciprocating sieve for separating the middlings after being operated upon by the air-current, and a bolt for separating any flour that may be carried off by the air which passes it, from the worthless material which passes with such flour, substantially as described.

2. The combination, in a machine for purifying middlings, of a fan for producing an ascending air-current through a chamber into which the middlings to be operated upon pass, and a revolving bolt (arranged to receive the material through its head) for separating any flour that may be carried off by the air which passes it from the worthless material which passes with such flour, substantially as described.

3. In a machine for purifying middlings, the combination of a fan for creating an ascending air-current through a chamber into which the middlings to be operated upon pass, a settling-chamber arranged between the main chamber and fan, and a revolving bolt arranged to receive through its head that portion of the material taken off by the air-current and not returned to the main chamber, substantially as and for the purpose specified.

4. The expanding air-chamber B, formed with an enlarged central portion, and contracted at its upper and lower ends, and having a feed-spout arranged to deliver the material within said chamber below the air-exit opening in the upper contracting portion thereof, substantially as and for the purpose specified.

5. The expanding-chamber B and chamber E, pipes C and $c$, and valve $c'$, constructed substantially as described, and arranged to operate with the fan D and sieve P, as and for the purpose specified.

6. The chamber E, pipes C $c$, and valve $c'$, arranged to operate with the fan D and chamber B, substantially as and for the purpose specified.

7. The combination, with the pipe H and fan D, of the bolt I, provided with the bolting-cloth heads $i$ $i'$, substantially as and for the purpose specified.

JOHN AFFLECK.

Witnesses:
HARRY LEE,
M. D. BROWNING, Jr.